United States Patent
Kang et al.

(10) Patent No.: US 8,314,194 B2
(45) Date of Patent: Nov. 20, 2012

(54) GEL ELECTROLYTE AND DYE-SENSITIZED SOLAR CELL USING THE SAME

(75) Inventors: Moonsung Kang, Suwon-si (KR); Yongsoo Kang, Seoul (KR); Jiwon Lee, Suwon-si (KR); Byongcheol Shin, Suwon-si (KR)

(73) Assignees: Samsung SDI Co., Ltd., Yongin-si (KR); Samsung Electronics Co., Ltd., Suwon-si (KR); Industry-University Cooperation Foundation Hanyang University, Seoul (KR)

( * ) Notice: Subject to any disclaimer, the term of this patent is extended or adjusted under 35 U.S.C. 154(b) by 874 days.

(21) Appl. No.: 12/341,199

(22) Filed: Dec. 22, 2008

(65) Prior Publication Data

US 2010/0051097 A1    Mar. 4, 2010

(30) Foreign Application Priority Data

Apr. 10, 2008  (KR) .................. 10-2008-0033369

(51) Int. Cl.
*C08F 26/06* (2006.01)
*C08F 216/12* (2006.01)
*H01L 31/00* (2006.01)

(52) U.S. Cl. .................. 526/258; 526/333; 136/256

(58) Field of Classification Search .................. 526/258, 526/333; 136/256
See application file for complete search history.

(56) References Cited

U.S. PATENT DOCUMENTS

| 2003/0145885 A1 | 8/2003 | Kang et al. |
| 2007/0175510 A1 | 8/2007 | Morooka et al. |
| 2007/0262694 A1 | 11/2007 | Mikoshiba et al. |
| 2007/0295383 A1 | 12/2007 | Li et al. |

OTHER PUBLICATIONS

Rowan et al. Polymer Preprints, 43(2), 460-461(2002).*
Rowan et al. Polymer Preprints, 44(1), 616-617(2003).*
Park et al. Polymeric Materials: Science and Engineering, 96, 138-139 (2007).*
U.S. Office action dated Apr. 1, 2011, for cross reference U.S. Appl. No. 12/201,582, 17 pages.
Shalav, et al, "App of NaYF4:E3+ up-converting phosphors..", Applied Physics Letters, vol. 86, (2005), pp. 013505-1 to 013505-3.
U.S. Office action dated Nov. 23, 2011, for cross reference U.S. Appl. No. 12/201,582, 17 pages.

* cited by examiner

*Primary Examiner* — Ling Choi
*Assistant Examiner* — Monique Peets
(74) *Attorney, Agent, or Firm* — Christie, Parker & Hale, LLP

(57) ABSTRACT

A gel electrolyte including a non-volatile polymer solvent including hydrogen bonding groups with at least two hydrogen bonding sites, and a dye-sensitized solar cell including the gel electrolyte. The dye-sensitized solar cell includes: opposing first and second electrodes; a porous layer disposed between the first and second electrodes, including an adsorbed dye; and the gel electrolyte, which is disposed between the first and second electrodes.

14 Claims, 3 Drawing Sheets

GEL ELECTROLYTE AND DYE-SENSITIZED SOLAR CELL USING THE SAME

CROSS-REFERENCE TO RELATED APPLICATION

This application claims the benefit of Korean Patent Application No. 2008-33369, filed on Apr. 10, 2008, in the Korean Intellectual Property Office, the disclosure of which is incorporated herein, by reference.

BACKGROUND OF THE INVENTION

1. Field of the Invention

Aspects of the present invention relate to a gel electrolyte, and a dye-sensitized solar cell using the same.

2. Description of the Related Art

Generally, dye-sensitized solar cells include: a photocathode having a semiconductor oxide nano particle layer, to which dye molecules are adsorbed; a counter electrode including a Pt catalyst; and an electrolyte including redox ion couples. The electrolyte greatly contributes to the photoelectric conversion efficiency and durability of solar cells. In this regard, liquid electrolytes are commonly used in solar cells.

However, a volatile organic solvent, included in liquid electrolytes, easily volatilizes or leaks, thereby deteriorating the durability of solar cells including such liquid electrolytes. Thus, there is a need for a non-volatile, ionic gel electrolyte, in order to improve the durability of dye-sensitized solar cells.

Methods of preparing ionic gel electrolytes include: a method of gelling a liquid electrolyte by adding nano particles to the liquid electrolyte; a method of gelling a liquid electrolyte by adding a polymer to the liquid electrolyte; a method of solidifying a liquid solvent by adding a gelling agent to the liquid solvent; and a method of polymerizing or crosslinking monomers, via chemical bonds (US 20030145885A). Among these methods, an ionic gel electrolyte, prepared by adding a polymer to the liquid electrolyte, has far less ion conductivity than the liquid electrolyte.

According to the method of solidifying the liquid solvent by adding a gelling agent, the stability of the solvent may be decreased, as the temperature is increased. According to the method of polymerizing or crosslinking monomers via chemical bonds, the temperature should be increased, and an initiator should be added thereto, in order to initiate reactions after injecting the monomers into cells. Thus, the efficiency of solar cells may be decreased, and unreacted materials may reduce the durability of the solar cells. According to the method of gelling a liquid electrolyte by adding nano particles to the liquid electrolyte, the gelation properties of the electrolyte are not satisfactory, even though the ion conductivity is excellent.

SUMMARY OF THE INVENTION

Aspects of the present invention provide a gel electrolyte having improved ion conductivity and gelation properties, and a dye-sensitized solar cell including the gel electrolyte, which has improved photoelectric conversion efficiency.

According to an aspect of the present invention, there is provided a gel electrolyte comprising a non-volatile polymer solvent having a hydrogen bonding group with at least two hydrogen bonding sites.

According to another aspect of the present invention, there is provided a dye-sensitized solar cell comprising: a first electrode; an opposing second electrode; a porous layer, to which a dye is adsorbed, disposed between the first electrode and the second electrode; and a gel electrolyte disposed between the first electrode and the second electrode. The gel electrolyte comprises a non-volatile polymer solvent having a hydrogen bonding group with at least two hydrogen bonding sites.

Additional aspects and/or advantages of the invention will be set forth in part in the description which follows, and in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EXEMPLARY EMBODIMENTS

Figure 1:
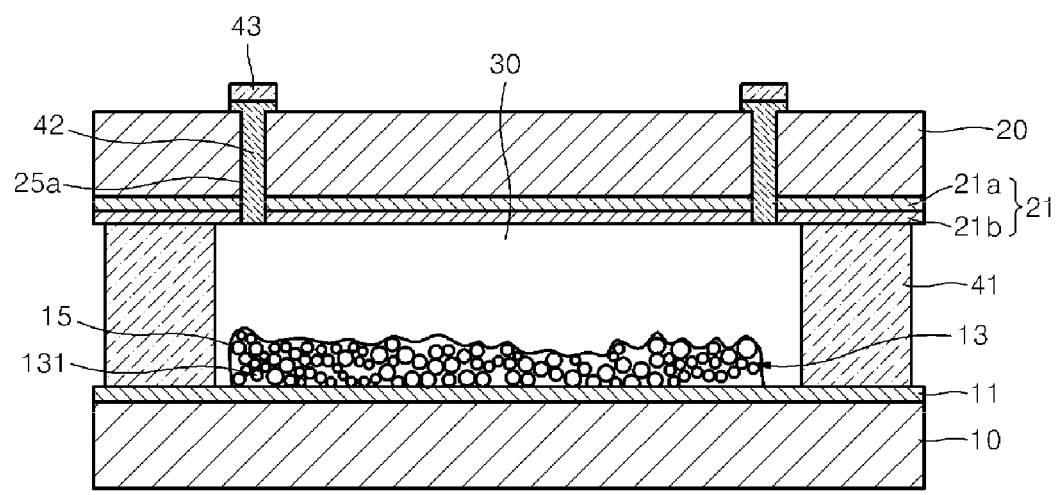
FIG. 1 is a cross-sectional view of a dye-sensitized solar cell, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

A gel electrolyte, according to aspects of the present invention, includes a non-volatile polymer solvent having a hydrogen bonding group with at least two hydrogen bonding sites. The non-volatile polymer solvent may include a polymer having a hydrogen bonding group, which is hydrogen bonded to a diacid. Alternatively, the non-volatile polymer solvent may include two types of polymers having hydrogen bonding groups. Thus, the gel electrolyte is an ionic gel electrolyte that can be solidified by self assembly, without adding a separate crosslinking agent or gelling agent.

Each of the hydrogen bonding groups may include at least two hydrogen bonding sites, and in particular, from 2 to 4 hydrogen bonding sites. The term "hydrogen bonding group" is used to represent a functional group including atoms with high electronegativities, such as oxygen atoms and nitrogen atoms, which may form hydrogen bonds. The hydrogen bonding group may be any of the compounds represented by the structures below, but is not limited thereto.

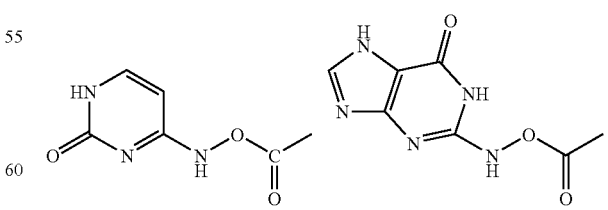

As shown above, a functional group capable of forming at least one hydrogen bond is regarded as "a hydrogen bonding group," regardless of the number of moieties capable of forming hydrogen bonds, that is, regardless of the number of hydrogen bonding sites.

The term "non-volatile polymer solvent" refers to a substance which is a non-volatile polymer and functions as a solvent during the formation of the gel electrolyte. Thus, an additional solvent, which is used to form conventional gel electrolyte, is not necessary for the formation of the gel electrolyte.

The polymer including the hydrogen bonding group may be a polyalkylene oxide-based compound, having a hydrogen bonding group at one end, and having a weight average molecular weight of 2,000, or less, and in particular, ranging from 200 to 1,000. If the weight average molecular weight of the non-volatile polymer solvent is greater than 2,000, the ion mobility in the gel electrolyte may be decreased, due to an increased viscosity thereof.

The polyalkylene oxide-based compound may be a polyethylene oxide-based compound, a polypropylene-based compound, or the like. The polymer including the hydrogen bonding group may be one of the compounds represented by the following Formulae 1 to 3.

Formula 1

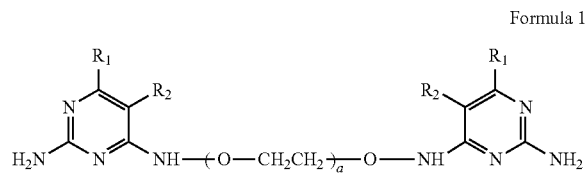

In Formula 1, $R_1$ is a substituted or unsubstituted C1-C20 alkyl group, a substituted or unsubstituted C6-C20 aryl group, or a substituted or unsubstituted C2-C20 heteroaryl group. $R_2$ is a substituted or unsubstituted C1-C20 alkyl group, a substituted or unsubstituted C6-C20 aryl group, or a substituted or unsubstituted C2-C20 heteroaryl group, and a is an integer from 1 to 50.

Formula 2

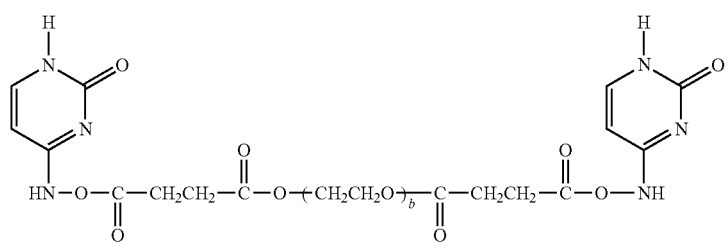

In Formula 2, b is an integer from 1 to 50.

Formula 3

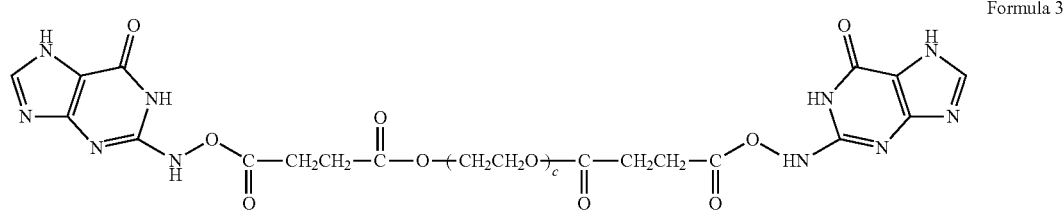

In Formula 3, c is an integer from 1 to 50.

The polymer represented by Formula 1 may be a compound represented by Formula 4 below.

Formula 4

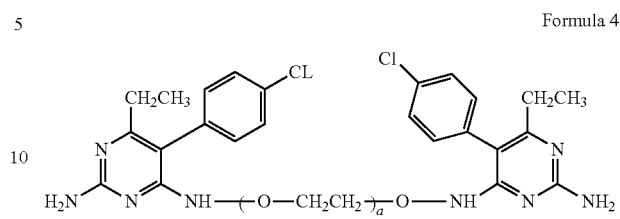

In Formula 4, a is an integer from 1 to 33.

The compound of Formula 1 may be prepared by mixing a polyethylene glycol dimesylate represented by Formula 5 below and calcium carbonate, adding pyrimethamine represented by Formula 6 below to the mixture, and reacting the mixture at a temperature between 60 and 80° C., and in particular, between 65 and 70° C.

Formula 5

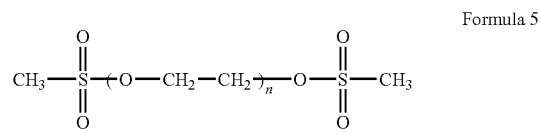

In Formula 5, n is an integer from 1 to 33.

Formula 6

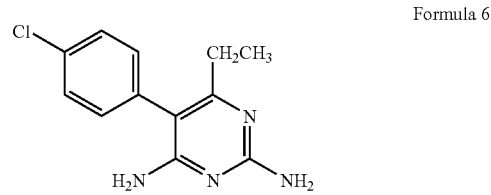

The compound of Formula 2 may be prepared by mixing a polyethylene glycol-(succinimidyl succinate) represented by Formula 7 below and a cytosine represented by Formula 8 below, and reacting the mixture at a temperature between 60 and 80° C., and in particular between 65 and 70° C., in the presence of a solvent.

Formula 7

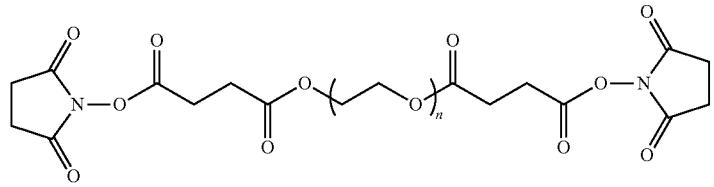

In Formula 7, n is an integer from 1 to 33.

Formula 8

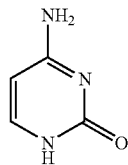

The compound of Formula 3 may be prepared by mixing a polyethylene glycol-(succinimidyl succinate) of Formula 7 and a guanine represented by Formula 9 below, and reacting the mixture at a temperature between 30 and 45° C., and in particular between 35 and 40° C., in the presence of a solvent.

Formula 9

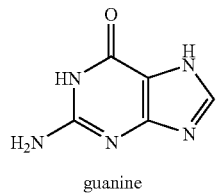

guanine

In Formula 2, b is generally an integer from 1 to 33. In Formula 3, c is generally an integer from 1 to 33.

According to an exemplary embodiment of the present invention, the gel electrolyte includes a polymer having a hydrogen bonding group and a diacid, which form hydrogen bonds when they are mixed and reacted at a predetermined temperature. The diacid forms hydrogen bonds with the polymer at hydrogen bonding sites.

Examples of the diacid include glutaric acid, malonic acid, and adipic acid. The amount of the diacid may range from 2.05 to 2.5 moles, per mole of the compound of Formula 1. If the amount of the diacid is greater than 2.5 moles, residual acid may deteriorate gelation properties of the gel electrolyte and reduce a driving voltage of a solar cell. On the other hand, if the amount of the diacid is less than 2.05 moles, unreacted solvent may deteriorate gelation properties of the gel electrolyte.

An example of the non-volatile polymer solvent that is hydrogen bonded to a diacid is shown in the structural formula below. A hydrogen bonding group of the polymer represented by Formula 1 forms hydrogen bonds with a hydrogen bonding group of the glutaric acid. Here, each of the hydrogen bonding groups of the compound of Formula 1 has two hydrogen bonding sites.

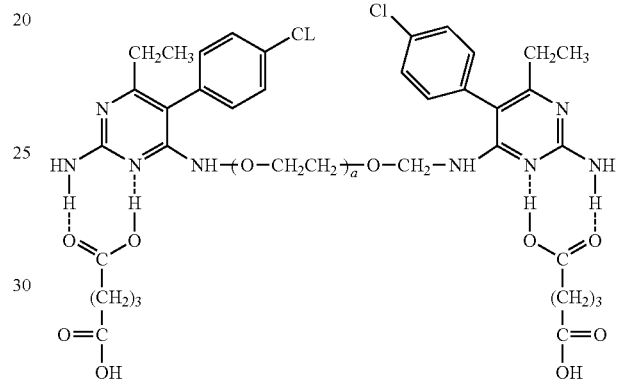

In the above formula, a is an integer from 1 to 33.

According to another exemplary embodiment of the present invention, the gel electrolyte includes a non-volatile polymer solvent having two types of polymers having hydrogen bonding groups. Hydrogen bonds are formed between the two types of polymers.

As shown in the structural formula below, a hydrogen bonding group A of the compound of Formula 2 forms hydrogen bonds with a hydrogen bonding group B of the compound of Formula 3. Here, each of the hydrogen bonding groups A, B have three hydrogen bonding sites.

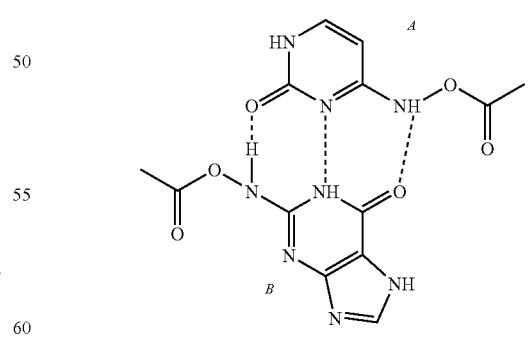

The amount of the compound of Formula 3 may range from 1.05 to 1.5 moles, per mole of the compound of Formula 2. If the amount of the compound of Formula 3 is not within the range above, unreacted solvent, which does not form hydrogen bonds, may deteriorate the gelation properties of the gel electrolyte.

The gel electrolyte may include a nano metal oxide, which can enhance the gelation properties, ion conductivity, and light scattering properties of the gel electrolyte. The nano metal oxide may be at least one selected from the group consisting of $TiO_2$, $WO_3$, ZnO, $Nb_2O_5$, $SnO_2$, $SiO_2$, and $TiSrO_3$. The nano metal oxide may be in the form of nano particles or a nano-sized structure. If a particulate nano metal oxide is added to the gel electrolyte, an average particle diameter of the nano metal oxide particles may range from 20 to 400 nm. If the average particle diameter is not within the range above, the nano metal oxide may not adequately improve the conductivity and/or reduce the light scattering properties of the gel electrolyte.

The gel electrolyte may further include an up-conversion phosphor or a down-conversion phosphor, in addition to the nano metal oxide. An average particle diameter of the phosphors may range from 100 nm to 10 μm.

The up-conversion phosphor directly converts ultra violet (UV) light into visible light. The down-conversion phosphor directly converts infrared (IR) light into visible light, which is absorbed by a dye, to increase the power generating efficiency of a solar cell.

Examples of the up-conversion phosphor include $YF_3$:$Yb^{3+}$, $Er^{3+}$, $NaYF_4$:$Yb^{3+}$, $Er^{3+}$, $NaLaF_4$:$Yb^{3+}$, $Er^{3+}$, $LaF_4$:$Yb^{3+}$, $Er^{3+}$, $BaY_2F_8$:$Yb^{3+}$, $Er^{3+}$, and $Na_3YGe_2O_7$:$Yb^{3+}$, $Er^{3+}$, but are not limited thereto. Examples of the down-conversion phosphor include $(Sr, Ba, Ca)_2Si_5N_8$:$Eu^{2+}$, $CaAlSiN_3$:$Eu^{2+}$, $BaMgAl_{10}O_{17}$:$Eu^{2+}$, $BaMgAl_{10}O_{17}$:$Eu^{2+}$, $Mn^{2+}$, SiAlON:$Eu^{2+}$, $(Ca, Sr, Ba)_2P_2O_7$:$Eu^{2+}$, $(Ca, Sr, Ba)_2P_2O_7$:$Eu^{2+}$, $Mn^{2+}$, $(Ca, Sr, Ba)_5(PO_4)_3Cl$:$Eu^{2+}$, $Lu_2SiO_5$:$Ce^{3+}$, $(Ca, Sr, Ba)_3SiO_5$:$Eu^{2+}$, $(Ca, Sr, Ba)_2SiO_4$:$Eu^{2+}$, $(Ca, Sr, Ba)_{10}(PO_4)_6.nB_2O_3$:$Eu^{2+}$, $Sr_4Al_{14}O_{25}$:$Eu^{2+}$, and $3.5 MgO.0.5MgF_2.GeO_2$:$Mn^{4+}$, but are not limited thereto.

The ion conductivity and gelation properties of the gel electrolyte can be optimized by controlling the number of hydrogen bonding sites of the hydrogen bonding group. The gelation properties, ion conductivity, and light scattering properties may further be improved, by including the nano metal oxide in the gel electrolyte.

The gel electrolyte, according to aspects of the present invention, includes a non-volatile polymer solvent having a hydrogen bonding group with at least two hydrogen bonding sites, as described above. The hydrogen bonds may be identified by an infrared analysis (IR). The gel electrolyte may be used as an electrolyte of a secondary battery, a capacitor, or a solar cell.

The gel electrolyte may further include a redox couple. Such an electrolyte is efficiently used in a dye-sensitized solar cell. The redox couple may be an iodine($I_2$)/iodized salt. $I^-$ and $I_3^-$ ions may be prepared from the iodine and the iodized salt. The $I^-$ and $I_3^-$ ions reversibly react with each other.

Examples of the iodized salt include lithium iodide, sodium iodide, potassium iodide, magnesium iodide, copper iodide, silicon iodide, manganese iodide, barium iodide, molybdenum iodide, calcium iodide, iron iodide, cesium iodide, zinc iodide, mercury iodide, ammonium iodide, methyl iodide, methylene iodide, ethyl iodide, ethylene iodide, isopropyl iodide, isobutyl iodide, benzyl iodide, benzoyl iodide, allyl iodide, imidazolium iodide, and 1-methyl-3-propylimidazolium iodide, but are not limited thereto.

The amount of the iodized salt may be 0.05 to 0.1 moles, per mole of the non-volatile polymer solvent. If the amount of the iodized salt is less than 0.05 moles, the ion conductivity of the gel electrolyte may be decreased. On the other hand, if the amount of the iodized salt is greater than 0.1 moles, the viscosity of the gel electrolyte may be increased, due to mutual interference between the ions.

The amount of iodine may range from 1 to 10 parts by weight, based on 100 parts by weight of the iodized salt. If the amount of iodine is less than 1 part by weight, the ion conductivity of the gel electrolyte may be decreased. On the other hand, if the amount of iodine is greater than 10 parts by weight, the electron recombination in the gel electrolyte, due to $I_3^-$ ions, may be increased.

Examples of the unsubstituted C1-C20 alkyl group of Formula 1 include a methyl group, an ethyl group, a propyl group, an isobutyl group, a sec-butyl, a pentyl group, an iso-amyl group, and a hexyl group. At least one of the hydrogen atoms in the C1-C20 alkyl group may be substituted with a halogen atom, a C1-C30 alkyl group, a C1-C30 alkoxy group, a lower alkylamino group, a hydroxy group, a nitro group, a cyano group, an amino group, an amidino group, hydrazine, hydrazone, a carboxyl group, a sulfonic acid group, a phosphoric acid group, or the like.

The unsubstituted C6-C20 aryl group of Formula 1 refers to a carbocyclic aromatic system having one or more rings, which may be fused or connected to each other using a pendent method. The term "aryl" includes aromatic radicals, such as a phenyl, a naphthyl, and a tetrahydronaphthyl. In addition, at least one of the hydrogen atoms in the C6-C20 aryl group may be substituted with substituents described with reference to the C1-C20 alkyl group.

The unsubstituted C2-C20 heteroaryl group of Formula 1 refers to a monovalent monocyclic radical that includes 1, 2, or 3 atoms selected from N, O, P, and S and includes a ring composed of 2 to 30 carbon atoms. Examples of the C2-C20 heteroaryl group include a pyridyl, a thienyl, and a furyl. At least one of the hydrogen atoms in the C2-C20 heteroaryl group may be substituted with substituents described with reference to the C1-C20 alkyl group.

Hereinafter, a method of preparing a dye-sensitized gel electrolyte, according to aspects of the present invention, will be described. According to an exemplary embodiment of the present invention, a polymer having a hydrogen bonding group is mixed with a diacid, and the mixture is reacted at a temperature between 40 and 45° C., to obtain a non-volatile polymer solvent that is hydrogen bonded to the diacid.

According to another exemplary embodiment of the present invention, two types of polymers, having different hydrogen bonding groups, are mixed are a predetermined molar ratio, and the mixture is reacted at a temperature between 40 and 45° C., to obtain a non-volatile polymer solvent, in which the polymers are hydrogen bonded to each other. Then, an iodized salt and iodine are added to the non-volatile polymer solvent, to complete the preparation of a dye-sensitized gel electrolyte.

As described above, an organic solvent is not essential in the gel electrolyte. This differs from typical gel electrolytes and liquid electrolytes, which generally require an organic solvent.

When the non-volatile polymer solvent is mixed with the iodine and the iodized salt, a nano metal oxide mixture may further be added thereto. The nano metal oxide mixture includes the nano metal oxide dispersed in a volatile organic solvent. The mixture is stirred and pulverized, using ultrasonic waves.

The volatile organic solvent may be acetonitrile, methoxypropionitrile, or the like, and the amount of the volatile organic solvent may range from 1000 to 10000 parts by weight, based on 100 parts by weight of the nano metal oxide. After the mixture is added to the non-volatile polymer solvent, the resultant is dried to remove the volatile solvent and complete the manufacture of a gel electrolyte including the nano metal oxide.

FIG. 1 is a cross-sectional view of a dye-sensitized solar cell, according to an exemplary embodiment of the present invention. Referring to FIG. 1, the dye-sensitized solar cell includes a first substrate 10, an opposing second substrate 20, and a gel electrolyte 30 disposed therebetween. A first electrode 11, a porous layer 13, and a dye 15 are disposed on the first substrate 10. A second electrode 21 is disposed on the second substrate 20.

The first substrate 10, which supports the first electrode 11, is transparent. The first substrate 10 may be formed of a transparent glass or plastic, for example. Examples of the plastic include polyethylene terephthalate (PET), polyethylene naphthalate (PEN), polycarbonate (PC), polypropylene (PP), polyimide (PI), and triacetyl cellulose (TAC).

The first electrode 11 may be formed of a transparent material selected from the group consisting of an indium tin oxide, an indium oxide, a tin oxide, a zinc oxide, a sulfur oxide, a fluorine oxide, a mixture thereof, $ZnO$—$Ga_2O_3$, and $ZnO$—$Al_2O_3$. The first electrode 11 may include a single, or multiple layers of the transparent material.

The porous layer 13 is formed on the first electrode 11. The porous layer 13 includes metal oxide particles 131 having a minute and generally uniform average particle diameter. The metal oxide particles 131 can be formed using a self-assembly method. The porous layer 13 may also have nanoporous properties, due to having a fine and uniform pore size. The average diameter of pores of the porous layer 13 may range from 7.5 nm to 15 nm.

The thickness of the porous layer 13 may range from 10 nm to 3000 nm, and in particular from 10 nm to 1000 nm. However, the thickness of the porous layer 13 is not limited thereto. The dye 15, which absorbs light and generates exited electrons, is adsorbed into the surface of the porous layer 13.

The metal oxide particles 131 may be formed of a titanium oxide, a zinc oxide, a tin oxide, a strontium oxide, an indium oxide, an iridium oxide, a lanthan oxide, a vanadium oxide, a molybdenum oxide, a tungsten oxide, a niobium oxide, a magnesium oxide, an aluminum oxide, a yttrium oxide, a scandium oxide, a samarium oxide, a gallium oxide, a strontium titanium oxide, or the like. In this regard, the metal oxide particles 131 are formed of $TiO_2$, $SnO_2$, $WO_3$, $ZnO$, or a complex thereof, in particular.

The dye 15 included in the porous layer 13 may be any substance that is used in solar cells or photocells. For example, the dye 15 may be a ruthenium (Ru) complex. The Ru complex may be $RuL_2(SCN)_2$, $RuL_2(H_2O)_2$, $RuL_3$, or $RuL_2$ (L is 2,2'-bipyridyl-4,4'-dicarboxylate).

However, the dye 15 can be any dye that has a suitable charge separation capability and is sensitized when exposed to light. For example, the dye 15 can be, in addition to Ru complex, an xanthene type pigment, such as rhodamine B, rose gengal, eosine, or erythrosine; a cyanine-type pigment, such as quinocyanine or cryptocyanine; a basic dye, such as phenosafranin, Capri blue, thiocine, or methyleneblue; chlorophyll; a porphyrin-based compound, such as zinc porphyrin, or magnesium porphyrin; other azo pigments; a complex compound, such as a phthalocyane compound or Ru trisbipyridiyl; antraquinone-based pigment; or polycyclic quinine-based pigment. These compounds can be used alone or in combination.

The second substrate 20 supports the second electrode 21 and may be transparent. In this regard, the second substrate 20, like the first substrate 10, may be formed of glass or plastic.

The second electrode 21 faces the first electrode 11 and may include a transparent electrode 21a and a catalyst electrode 21b. The transparent electrode 21a may be formed of a transparent material, such as an indium tin oxide, a fluoro tin oxide, an antimony tin oxide, a zinc oxide, a tin oxide, $ZnO$—$Ga_2O_3$, $ZnO$—$Al_2O_3$, or the like. The transparent electrode 21a may include a single, or multiple layers of the transparent material. The catalyst electrode 21b activates a redox couple, and may be formed of Pt, Ru, Pd, Ir, Rh, Os, C, $WO_3$, $TiO_2$, or the like.

The first substrate 10 is attached to the second substrate 20, using an adhesive 41. A gel electrolyte forming composition is injected between the first electrode 11 and the second electrode 21, through a hole 25a defined in the second substrate 20 and the second electrode 21. The gel electrolyte forming composition is then used to form the gel electrolyte 30.

The gel electrolyte 30 transfers electrons from the second electrode 21 to the dye 15, through oxidation and reduction. The hole 25a is sealed using an adhesive 42 and a glass cover 43.

The gel electrolyte forming composition is prepared by mixing a polymer having a hydrogen bonding group, a diacid, a solvent that can dissolve the polymer or the diacid, an iodized salt, and iodine. In the alternative, the gel electrolyte forming composition may be prepared by mixing two types of polymers having hydrogen bonding groups, a solvent that can dissolve the polymers, an iodized salt, and iodine. The gel electrolyte forming composition is injected into the dye-sensitized solar cell, at a temperature at which hydrogen bonds are not formed between the polymer and the diacid, or between the two types of polymers. The temperature ranges from 80 to 120° C.

Although not shown in FIG. 1, the gel electrolyte 30 may also be prepared according to the following process. The gel electrolyte forming composition 30 may be directly coated on the porous layer 13 and dried, to form the gel electrolyte 30. This coating process is conducted at conditions and temperatures at which hydrogen bonds are formed between the polymer and the diacid, or between the two types of polymers.

Next, the adhesive 41 is disposed on the first substrate 10, around where the gel electrolyte 30 is formed. The resulting structure is covered with the second substrate 20. The adhesive 41 may be a thermoplastic polymer film, for example Suryln (DuPont Chemical Co.). The resultant structure is hot-pressed, to obtain a dye-sensitized solar cell.

Aspects of the present invention will now be described in greater detail, with reference to the following examples. The following examples are for illustrative purposes only and are not intended to limit the scope of the invention.

EXAMPLE 1

Preparation of a 2-H (Two Hydrogen Bonding Sites) Hydrogen Bonding Electrolyte 1 g of 1 M poly(ethylene glycol) dimesylate (Mw: 2,000 g/mol) (n is 33 in Formula 5) and 0.138 g of calcium carbonate were mixed, and the mixture was dissolved in 31.44 g of acetonitrile. Then, 2 M pyrimethamine was added thereto, and the mixture was reacted at 70° C., for 48 hours, while stirring, to obtain a compound represented by Formula 4 (a=33). The weight average molecular weight of the compound of Formula 4 was 2295.42 g/mol.

1 g of the compound of Formula 4 was filtered, using a mixed solution of 30 ml of THF and 30 ml of pentane, to obtain an intermediate. The intermediate and 0.07 g of 1M glutaric acid were dissolved in 30 ml of acetone, and the resultant mixture was reacted at 70° C., for 72 hours, to obtain a 2-H, hydrogen bonding, non-volatile, polymer solvent.

The 2-H, hydrogen bonding, non-volatile, polymer solvent was mixed with 1-methyl-3-propylimidazolium iodide (MPII), at a molar ratio of 20:1, and 10 parts by weight of $I_2$, based on 100 parts by weight of MPII, was added thereto, to complete the preparation of a gel electrolyte. All of the reagents in Example 1 were purchased from Aldrich Chemical Co.

EXAMPLE 2

Preparation of 3-H (Three Hydrogen Bonding Sites) Hydrogen Bonding Gel Electrolyte 1 M poly(ethylene glycol)-(succinimidyl succinate)$_2$ (Mw=2,000 g/mol) (n is 33 in Formula 7) and 2 M cytosine were dissolved in a solution of 20 ml of acetonitrile and 20 ml of dichloromethane, and the mixture was reacted at 40° C., for 24 hours, while stirring, to obtain a compound of Formula 2 (b=33). The weight average molecular weight of the compound of Formula 2 was 2,100 g/mol.

1M poly(ethylene glycol)-(succinimidyl succinate)$_2$ (Mw=2,000 g/mol) and 2M guanine were dissolved in a solution of 20 ml of acetonitrile and 20 ml of dichloromethane, and the mixture was reacted at 40° C., for 24 hours, while stirring, to obtain a compound of Formula 3 (c=33). The weight average molecular weight of the compound of Formula 3 was 2,132 g/mol.

1 mole of the compound of Formula 2 and 1 mole of the compound of Formula 3 were dissolved in 30 ml of acetonitrile, and the mixture was reacted at 30° C., for 72 hours, to obtain a 3-H, hydrogen bonding, non-volatile, polymer solvent.

The obtained 3-H, hydrogen bonding, non-volatile, polymer solvent was mixed with 1-methyl-3-propylimidazolium iodide (MPII), at a molar ratio of 20:1. 10 parts by weight of $I_2$, based on 100 parts by weight of MPII, was added thereto, to complete the preparation of an ionic gel electrolyte. All of the reagents in Example 2 were purchased from Aldrich Chemical Co.

EXAMPLE 3

Preparation of 2-H Hydrogen Bonding Electrolyte Including Silica Nano Particles 10 parts by weight of fumed silica nano particles, having an average particle diameter of 20 nm, was added to 100 parts by weight of the 2-H, hydrogen bonding, gel electrolyte prepared according to Example 1, to prepare a 2-H, hydrogen bonding, gel electrolyte including silica nano particles. In order to disperse the nano particles, 20 parts by weight of acetonitrile, as a volatile organic solvent, based on 100 parts by weight of the electrolyte, was added thereto, and the mixture was stirred and sonicated. The dispersed nano particles were dried in an oven at 50° C., for 24 hours, and then further dried in a vacuum for 24 hours to remove the acetonitrile solvent, thereby completing the preparation of a gel electrolyte.

EXAMPLE 4

Preparation of 2-H Hydrogen Bonding Electrolyte Including $TiO_2$ Nano Particles 10 parts by weight of rutile $TiO_2$ nano particles (Tayca, Japan), having an average particle diameter of 100 nm, was added to 100 parts by weight of the 2-H, hydrogen bonding, gel electrolyte prepared according to Example 1, to prepare a 2-H, hydrogen bonding, gel electrolyte including $TiO_2$ nano particles.

In order to disperse the nano particles, 20 parts by weight of acetonitrile, based on 100 parts by weight of the electrolyte, was added thereto, and the mixture was stirred and sonicated. The dispersed nano particles were dried in an oven at 50° C., for 24 hours, and further dried in a vacuum for 24 hours, to remove the acetonitrile solvent, thereby completing the preparation of a gel electrolyte.

COMPARATIVE EXAMPLE 1

Preparation of Liquid Electrolyte

Poly(ethylene glycol) (Mw: 2,000 g/mol) was mixed with 1-methyl-3-propylimidazolium iodide (MPII), at a molar ratio of 20:1. 10 parts by weight of iodine, based on 100 parts by weight of MPII, was added thereto, to complete the preparation of a liquid electrolyte.

The ion conductivity of each of the electrolytes of Examples 1-4 and Comparative Example 1 was measured at 30° C., and the results are shown in Table 1 below.

TABLE 1

| Electrolyte | Ion conductivity (S/cm) |
| --- | --- |
| 2-H electrolyte (Example 1) | $5.00 \times 10^{-4}$ |
| 3-H electrolyte (Example 2) | $3.81 \times 10^{-4}$ |
| 2-H/silica electrolyte (Example 3) | $6.12 \times 10^{-4}$ |
| 2-H/$TiO_2$ electrolyte (Example 4) | $7.45 \times 10^{-4}$ |
| Non-hydrogen bonding electrolyte (Comparative Example 1) | $1.06 \times 10^{-4}$ |

As shown in Table 1, the electrolytes prepared according to Examples 1-4 had improved ion conductivities, as compared to the electrolyte prepared according to Comparative Example 1. The ion conductivities were increased in the electrolytes of Examples 1-4, since the molecules therein were arranged, due to the binding of the solvent molecules. The ion mobility was improved, even though the gelation was achieved by hydrogen bonds. In addition, the 2-H electrolyte, which has relatively weak hydrogen bonds, had a higher ion conductivity than the 3-H electrolyte. This phenomenon can be explained by a difference in flexibility between the molecular chains in the solvents, due to the hydrogen bonds. When nano metal oxide particles were added to the electrolyte, as in Examples 3 and 4, the gelation properties of the electrolytes were improved, due to the binding force among the nano metal oxide particles. In addition, the nano metal oxide particles promoted ion mobility, since the ions were adsorbed on the surface of the nano metal oxide particles.

Ion conductivities, of the electrolyte prepared according to Example 1, were measured according to temperature, and the results are shown in Table 2 below.

TABLE 2

| Temperature (° C.) | Ion conductivity (S/cm) |
| --- | --- |
| 20 | $4.00 \times 10^{-4}$ |
| 30 | $5.00 \times 10^{-4}$ |
| 45 | $1.74 \times 10^{-3}$ |
| 60 | $3.64 \times 10^{-3}$ |

According to Table 2, the ion conductivity of the electrolyte was increased, as the temperature was increased. In particular, the ion conductivity was greater than $10^{-3}$ S/cm at a temperature of at least 45° C. The ion conductivity was improved, as compared to the ion conductivity of a conventional gel electrolyte, which is less than $10^{-4}$ S/cm.

Figure 2:
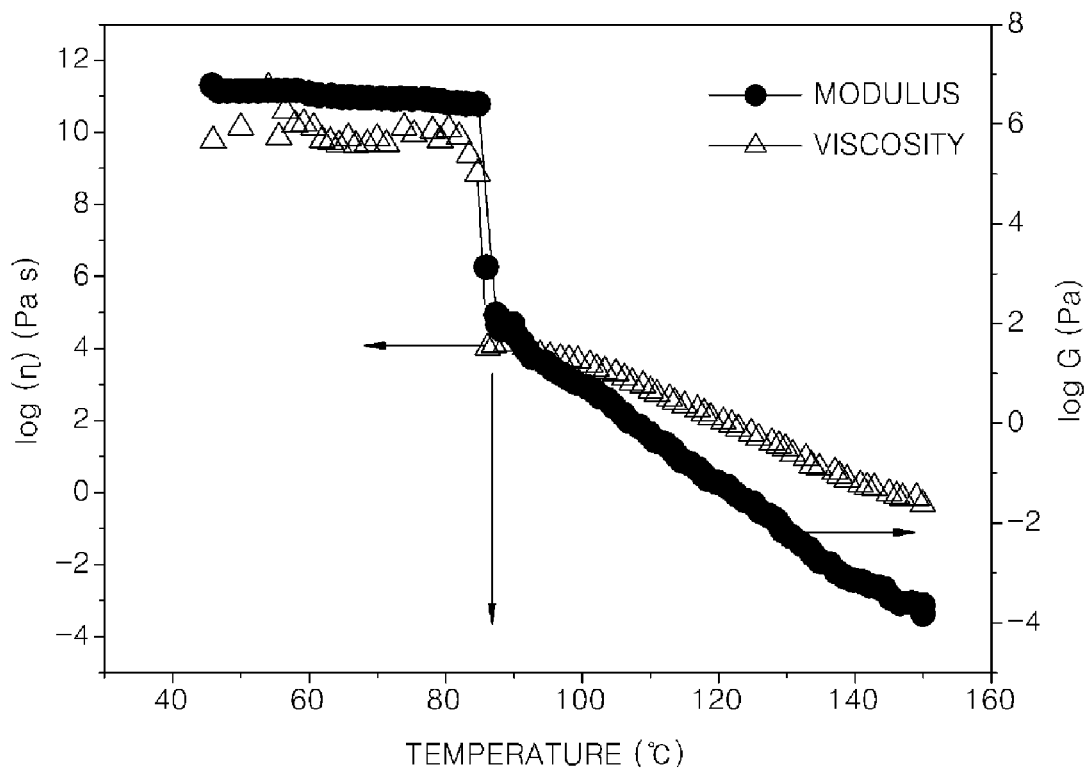
FIG. 2 is a graph illustrating the viscoelastic properties of a gel electrolyte prepared according to Example 1, as measured by a dynamic mechanical analysis (DMA)

FIG. 2 is a graph illustrating viscoelastic (gelation) properties of the gel electrolyte (2-H electrolyte) prepared according to Example 1, which were measured by a dynamic mechanical analysis (DMA). According to FIG. 2, it can be confirmed that the gel electrolyte was not converted to a liquid state, even at temperatures of 50° C., or higher, due to the hydrogen bonds. Typical solar cells operate a temperature of 60° C., or less, so the gel electrolyte according to Example 1 had stable gelation properties.

COMPARATIVE EXAMPLE 2

Preparation of Dye-Sensitized Solar Cell

A dispersion of titanium oxide particles, having a particle diameter of about 10 nm, was coated on 1 cm$^1$ of a first conductive film formed of ITO, using a doctor blade, and the resultant was calcined at 450° C., for 30 minutes, to prepare a porous layer having a thickness of 10 μm.

Then, the resultant was heated at 80° C. and immersed in 0.3 mM of a dye dispersion including a Ru(dcbpy)2(NCS)2 (dcbpy=2,2'-bipyridyl-4,4'-dicarboxylato) (535-bisTBA, Solaronix, Swiss)) dye, that was dissolved in ethanol. This dye absorption treatment was performed for longer than 12 hours.

The porous layer having the absorbed dye was washed with ethanol and dried at room temperature, to prepare a first electrode including a light absorbing layer. A second electrode was prepared by depositing a second conductive film formed of Pt on the first conductive film formed of ITO, using a sputter. A hole having a diameter of 0.75 mm was formed in the second electrode using a drill, in order to inject an electrolyte.

A support, formed of a thermoplastic polymer film having a thickness of 60 μm, was placed between the first and second electrodes. The first and second electrodes were pressed together at 100° C., for 9 seconds, to prepare an assembly. Then, the liquid electrolyte of Comparative Example 1 was injected into the assembly, through the hole in the second electrode. The hole was then sealed using a cover glass and a thermoplastic polymer film, to complete the preparation of a dye-sensitized solar cell. 1-hexyl-2,3-dimethyl imidazolium iodide, 0.1 M lithium iodide, 0.05 M iodine, and 0.5 M 4-tert-butylpyridine were dissolved in 3-methoxypropionitrile, to prepare the electrolyte.

EXAMPLE 5

Preparation of Dye-Sensitized Solar Cell

A dispersion of titanium oxide particles, having a particle diameter of about 10 nm, was coated on 1 cm$^2$ of a first conductive film formed of ITO, using a doctor blade. The resultant structure was calcined at 450° C., for 30 minutes, to prepare a porous layer having a thickness of 10 μm.

The resultant structure was maintained at 80° C. and immersed in 0.3 mM of a dye dispersion of a Ru(dcbpy)$_2$(NCS)$_2$ (dcbpy=2,2'-bipyridyl-4,4'-dicarboxylato) (535-bisTBA, Solaronix, Swiss)) dye that was dissolved in ethanol. This dye absorption treatment was performed for longer than 12 hours.

The resultant porous layer having the absorbed dye was washed with ethanol and dried at room temperature, to prepare a first electrode including a light absorbing layer. A second electrode was prepared by depositing a second conductive film formed of Pt on the first conductive film formed of ITO, using a sputter.

The composition of Example 1 was coated on the first electrode and dried to prepare a gel electrolyte. The composition was prepared by mixing 0.94 g of the compound of Formula 4, 0.06 g of glutaric acid, and 11.45 ml of acetonitrile as a solvent, to form a non-volatile solvent. The non-volatile solvent was mixed with 1-methyl-3-propylimidazolium iodide (MPII), at a molar ratio of 20:1. 10 parts by weight of $I_2$, based on 100 parts by weight of MPII, were then added thereto.

A support, formed of a thermoplastic polymer film having a thickness of 60 μm, was placed between the first and second electrodes. The first and second electrodes were pressed together at 100° C., for 9 seconds, thereby completing the preparation of a dye-sensitized solar cell.

EXAMPLE 6

A dye-sensitized solar cell was prepared in the same manner as in Example 5, except that the composition of Example 2 was used instead of the composition of Example 1. The composition was prepared by mixing 0.49 g of the compound of Formula 2, 0.51 g of the compound of Formula 3, and 11.45 ml of acetonitrile as a solvent, to form a non-volatile solvent. The non-volatile solvent was mixed with 1-methyl-3-propylimidazolium iodide (MPII), at a molar ratio of 20:1. 10 parts by weight of $I_2$, based on 100 parts by weight of MPII, where then added thereto.

EXAMPLE 7

A dye-sensitized solar cell was prepared in the same manner as in Example 5, except that the composition of Example 3 was used instead of the composition of Example 1.

The composition of Example 3 was prepared in the same manner as in Example 2, except that fumed silica nano particles, having an average particle diameter of 20 nm, were further added to the composition of Example 2.

EXAMPLE 8

A dye-sensitized solar cell was prepared in the same manner as in Example 5, except that the composition of Example 4 was used instead of the composition of Example 1. The composition of Example 4 was prepared in the same manner as in Example 2, except that 0.09 g of rutile $TiO_2$ nano particles (Tayca, Japan), having an average particle diameter of 100 nm, was further added to the composition of Example 2.

Photoelectric conversion characteristics of the dye-sensitized solar cells, prepared according to Examples 5-8 and Comparative Example 2, were measured at 100 mW/cm$^2$, and the results are shown in Table 3 below.

TABLE 3

| | Open circuit voltage Voc (V) | Short circuit current Jsc (mA · cm$^{-2}$) | Fill factor FF (%) | Photoelectric conversion efficiency η (%) |
|---|---|---|---|---|
| Example 5 | 0.71 | 10.4 | 62 | 4.63 |
| Example 6 | 0.69 | 10.1 | 65 | 4.53 |
| Example 7 | 0.72 | 10.0 | 72 | 5.36 |
| Example 8 | 0.71 | 14.1 | 65 | 6.39 |
| Comparative Example 2 | 0.71 | 7.3 | 66 | 3.84 |

As shown in Table 3, the photoelectric conversion efficiencies, of each of the dye-sensitized solar cells of Examples 5-8, were higher than that of the dye-sensitized solar cell of Comparative Example 2. In addition, the photoelectric conversion efficiency of the dye-sensitized solar cell of Example 8 (including the $TiO_2$ nano particles) was higher than the dye-sensitized solar cell of Example 7 (including silica nano particles). Since the $TiO_2$ nano particles have a physically weaker binding force than the silica nano particles, the $TiO_2$ nano particles had better ion conductivity and light scattering effects in the electrolyte layer. That is, the photoelectric conversion efficiency was improved, since light that was not absorbed in the photocathode layer was scattered by the particles included in the electrolyte and then absorbed.

Figure 3:
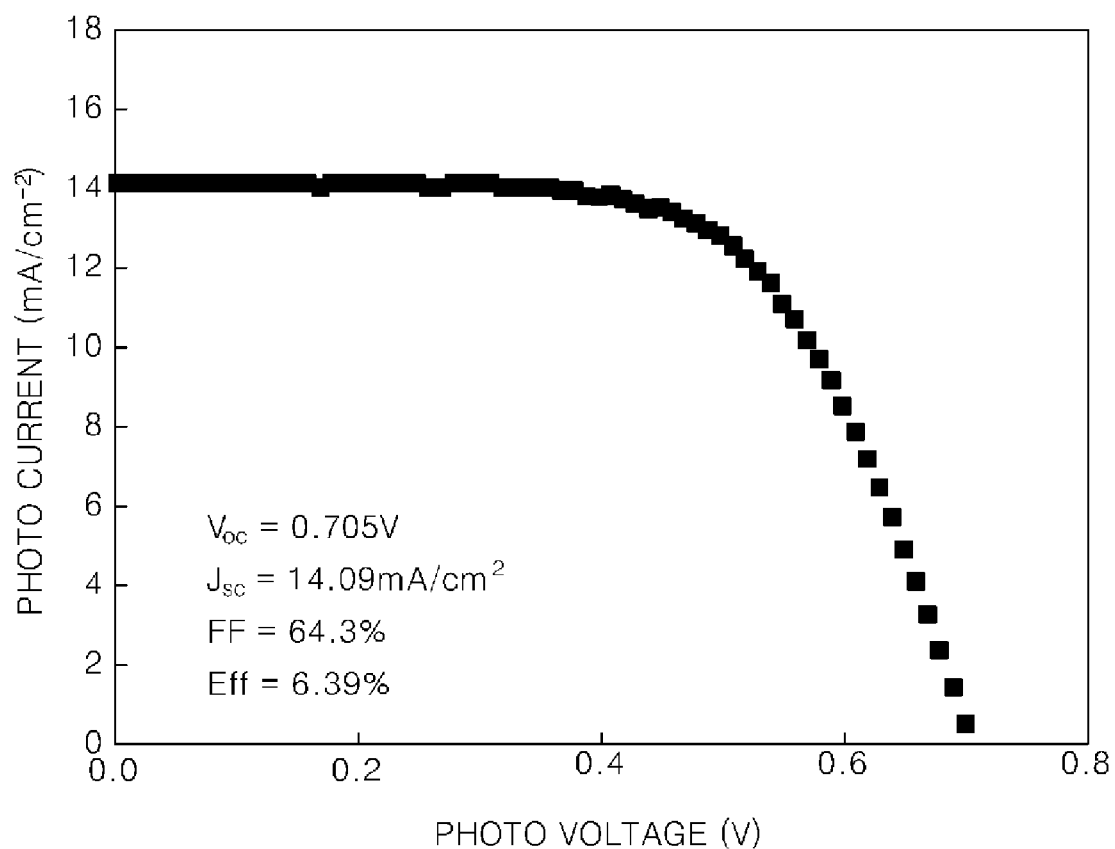
FIG. 3 is a graph illustrating the photoelectric conversion characteristics of a dye-sensitized solar cell prepared according to Example 8.

FIG. 3 is a graph illustrating optical current characteristics, according to the optical voltage of a dye-sensitized solar cell prepared according to Example 8. Referring to FIG. 3, the dye-sensitized solar cell of Example 8 had excellent photoelectric conversion characteristics.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A gel electrolyte comprising a non-volatile polymer solvent comprising a first polymer having a hydrogen bonding group with at least two hydrogen bonding sites, wherein:
the non-volatile polymer solvent further comprises a second polymer that is hydrogen bonded to the first polymer; or
the gel electrolyte further comprises a diacid that is hydrogen bonded to the first polymer.

2. The gel electrolyte of claim 1, wherein the first polymer is a polyalkylene oxide-based compound having a weight average molecular weight of 2000 g/mol, or less.

3. The gel electrolyte of claim 1, wherein the first polymer comprises at least one compound selected from the group consisting of compounds represented by Formulae 1 to 3 below:

Formula 1

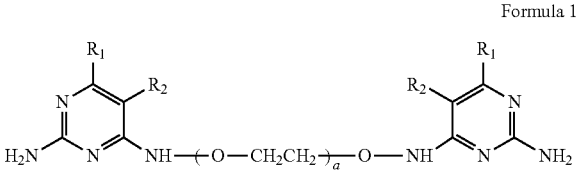

wherein $R_1$ is selected from the group consisting of a substituted or unsubstituted C1-C20 alkyl group, a substituted or unsubstituted C6-C20 aryl group, and a substituted or unsubstituted C2-C20 heteroaryl group, $R_2$ is selected from the group consisting of a substituted or unsubstituted C1-C20 alkyl group, a substituted or unsubstituted C6-C20 aryl group, and a substituted or unsubstituted C2-C20 heteroaryl group, and a is an integer from 1 to 50;

Formula 2

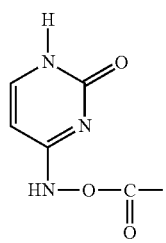 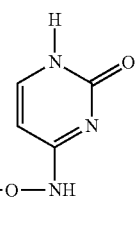

wherein b is an integer from 1 to 50; and

Formula 3

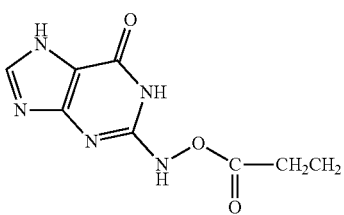

wherein c is an integer from 1 to 50.

4. The gel electrolyte of claim 3, wherein the compound of Formula 1 is represented by Formula 4:

Formula 4

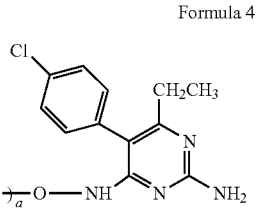

wherein a is an integer from 1 to 33.

5. The gel electrolyte of claim 1, wherein the diacid comprises at least one selected from the group consisting of glutaric acid, malonic acid, and adipic acid.

6. The gel electrolyte of claim 1, wherein the first polymer comprises a compound represented by Formula 2 below, and the second polymer comprises a compound represented by Formula 3 below:

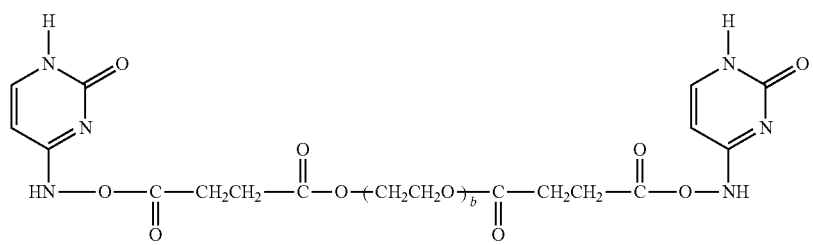

Formula 2 wherein b is an integer from 1 to 50; and

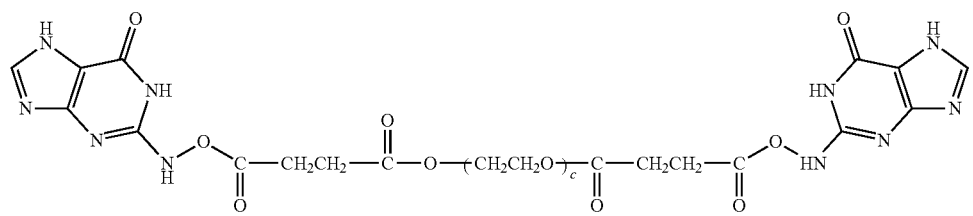

Formula 3 wherein c is an integer from 1 to 50.

7. A gel electrolyte comprising a non-volatile polymer solvent comprising a first polymer having a hydrogen bonding group with at least two hydrogen bonding sites, wherein:
the first polymer comprises a compound represented by the following Formula 1; and
the gel electrolyte comprises glutaric acid that is hydrogen bonded to the compound of Formula 1, Formula 1

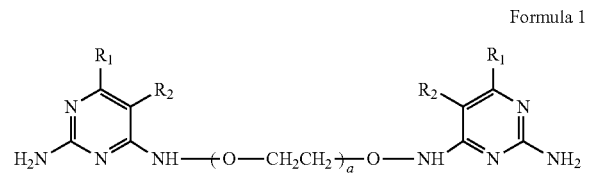

wherein $R_1$ is selected from the group consisting of a substituted or unsubstituted C1-C20 alkyl group, a substituted or unsubstituted C6-C20 aryl group and a substituted or unsubstituted C2-C20 heteroaryl group, $R_2$ is selected from the group consisting of a substituted or unsubstituted C1-C20 alkyl group, a substituted or unsubstituted C6-C20 aryl group, and a substituted or unsubstituted C2-C20 heteroaryl group, and a is an integer from 1 to 50.

8. The gel electrolyte of claim 7, wherein the gel electrolyte comprises from 2.05 to 2.5 moles of the glutaric acid, per mole of the compound represented by Formula 1.

9. A gel electrolyte comprising a non-volatile polymer solvent comprising a first polymer having a hydrogen bonding group with at least two hydrogen bonding sites, wherein:
the first polymer comprises a compound represented by Formula 2 below; and
the non-volatile polymer solvent further comprises a compound represented by Formula 3 below, which is hydrogen bonded to the compound of Formula 2, Formula 2

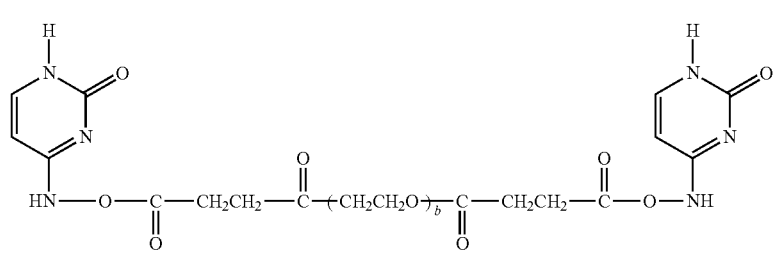

wherein b is an integer from 1 to 50, and

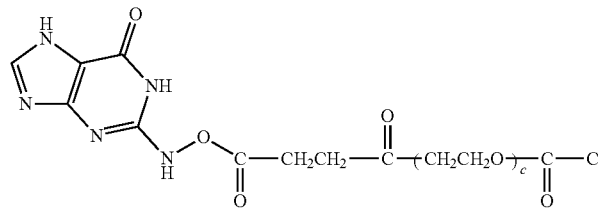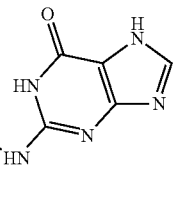

Formula 3 wherein c is an integer from 1 to 50.

10. The gel electrolyte of claim 9, wherein the non-volatile polymer solvent comprises from 1.05 to 1.5 moles of the compound of Formula 3, per mole of the compound of Formula 2.

11. A gel electrolyte comprising a non-volatile polymer solvent comprising a first polymer having a hydrogen bonding group with at least two hydrogen bonding sites, further comprising at least one metal oxide selected from the group consisting of $TiO_2$, $WO_3$, ZnO, $Nb_2O_5$, $SnO_2$, $SiO_2$, and $TiSrO_3$.

12. The gel electrolyte of claim 11, wherein the average particle diameter of the at least one metal oxide ranges from 20 to 400 nm.

13. A gel electrolyte comprising a non-volatile polymer solvent comprising a first polymer having a hydrogen bonding group with at least two hydrogen bonding sites, further comprising iodine and an iodized salt.

14. A gel electrolyte comprising a non-volatile polymer solvent comprising a first polymer having two hydrogen bonding groups that each has at least two hydrogen bonding sites, wherein the gel electrolyte further comprises a diacid that is hydrogen bonded to the first polymer.

* * * * *